Patented July 28, 1936

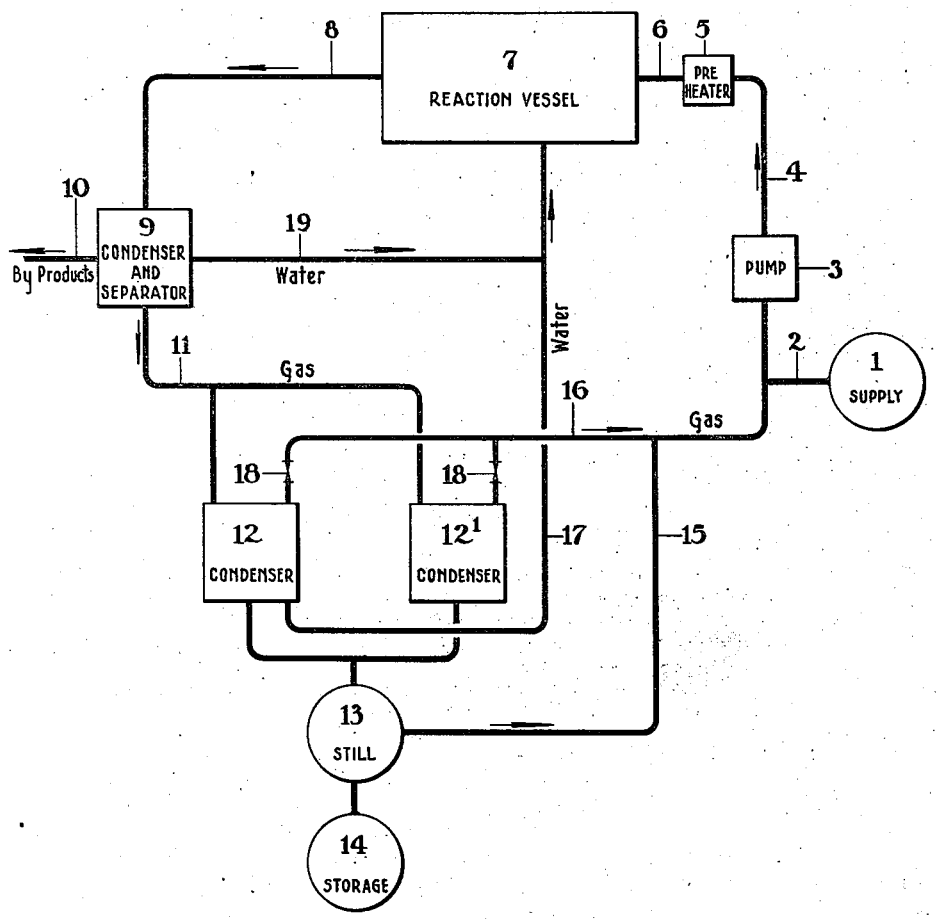

2,048,838

UNITED STATES PATENT OFFICE 2,048,838

PROCESS OF PRODUCING VINYL-
ACETYLENE

Albert S. Carter, Wilmington, Del., and Frederick B. Downing, Carneys Point, N. J., assignors to E. I. du Pont de Nemours & Company, Wilmington, Del., a corporation of Delaware Application May 21, 1931, Serial No. 538,920
Renewed June 5, 1935

26 Claims. (Cl. 260—171)

This invention relates to improvements in the process for polymerizing acetylene to nonbenzenoid hydrocarbons of high unsaturation, and more particularly to the process of polymerizing acetylene to vinylacetylene.

In the patents of Nieuwland Nos. 1,811,959 and 1,926,056, of Nieuwland and Vogt 1,926,055, and of Calcott and Downing 1,876,857 the polymerization of acetylene has been accomplished through the agency of a catalyst composed of cuprous salts, finely divided copper powder, and a salt of ammonia or a tertiary amine dissolved in water and/or a suitable acid. Through the agency of this catalyst, acetylene is caused to react with itself to produce highly unsaturated nonbenzenoid hydrocarbons of the general formula $(C_2H_2)_x$, such as vinylacetylene and divinylacetylene. These products have been readily separated and purified by simple known means of fractional distillation.

In the process described by the above patents, the relative quantities of the various constituents of the product may vary over a wide range; thus in the batch process, the product may be approximately 85% divinylacetylene, 10% $C_8H_8$ and 5% vinylacetylene and chlorinated impurities; and in the continuous process described by Calcott and Downing, the product may contain 15% vinylacetylene, 75% divinylacetylene and 10% of $C_8H_8$ and impurities. In none of these previous operations, as described in the above mentioned patents, has it been possible to obtain more than 18% of vinylacetylene.

The object of this invention has been to improve the process in such a manner as to make possible the recovery of high yields of vinylacetylene with a corresponding decrease in the yields of the higher acetylene polymers formed by this cuprous salt catalyst.

Our investigations lead us to believe that, in the operation of the catalyst, the acetylene is absorbed by the catalyst solution to form an addition compound containing acetylene, cuprous salts and possibly the nitrogen base. It is further believed that this addition compound is unstable, subsequently undergoing decomposition thus establishing an equilibrium between free acetylene, absorbed acetylene and acetylene liberated from the addition compound. The acetylene liberated is considered to be in an active state, hence may undergo reaction at the time of liberation. In agreement with the coordination valences of copper, it seems probable that two molecules of acetylene are involved in this complex molecule. At the instant of liberation, two activated molecules of acetylene may react, thus forming vinylacetylene. It has been discovered, also, that vinylacetylene may be absorbed by the catalyst in a manner identical to the absorption of acetylene, and by such operation, vinylacetylene is known to be converted to $C_8H_8$, thought to be 1,5,7-octatriene-3-ine. It is believed, therefore, that this conversion of $C_4H_4$ to $C_8H_8$ follows the same mechanism of absorption, activation and reaction as described for the conversion of $C_2H_2$ to $C_4H_4$. According to this theory, then, in the operation of the catalyst as described in the prior applications, acetylene is converted to vinylacetylene and a major portion of this further reacts to form compounds of higher molecular weight.

$C_8H_8$ is formed by the reaction of vinylacetylene with itself, but since both acetylene and vinylacetylene exist in the system, they may combine with each other, as well as with themselves, thus forming $C_6H_6$, which has been identified as divinylacetylene. Ignoring the intermediate complexes formed with the catalyst, these reactions may be shown as:

$$C_2H_2 + C_2H_2 = C_4H_4$$
$$C_2H_2 + C_4H_4 = C_6H_6$$
$$C_4H_4 + C_4H_4 = C_8H_8$$

The object of this invention is the production and isolation of high yields of vinylacetylene with a corresponding decrease in the production of divinylacetylene and $C_8H_8$.

Regardless of the correctness of the above hypothesis we have discovered that this end may be accomplished by removing vinylacetylene from the sphere of reaction as rapidly as it is formed. This may be accomplished in the batch process, but not efficiently. Thus a suitable cuprous copper catalyst may be charged with acetylene and the product distilled out through a condenser held at −40 to −70° C. within eight hours of the time of charging. In this manner, part of the acetylene reacts to form vinylacetylene, but the concentration of the latter at no time builds up to sufficient quantity to permit the formation of much divinylacetylene. The gas evolved upon distilling the catalyst contains approximately 10 to 20% of vinylacetylene and practically no divinylacetylene, the remainder being unconverted acetylene. If the charged catalyst is allowed to age for 24 hours or longer, the major portion of the product will be divinylacetylene, for during this period of aging, the concentration of vinylacetylene builds up with subsequent formation of divinylacetylene or $C_8H_8$.

The present invention, therefore, while it comprehends the batch process, is especially applicable to the preparation of acetylene polymers through the use of a continuous process similar in some respects to that described by Calcott and Downing in their application identified above.

In carrying out the modified continuous process of Calcott and Downing, to obtain a product consisting essentially of vinylacetylene, the working conditions of the catalyst itself are essentially the same as those described in previous patents, and the gases passing over the catalyst should be subjected to essentially the same cycle as required by Calcott and Downing in the continuous process.

The continuous production of high yields of vinylacetylene, however, is dependent upon a higher gas circulation rate than the production of divinylacetylene and the higher polymers of acetylene. In the Calcott and Downing process, the minimum circulation rate was described as that gas velocity which was sufficient to carry off substantially all of the unsaturated oily products before non-volatile or resinous products are entrained in the reaction catalyst. This condition involves a process whereby a mixture of approximately 70% divinylacetylene, 20% vinylacetylene and 10% of tetramer or $C_8H_8$ are formed, providing the effluent products are completely condensed as they leave the catalyst. We have found that by increasing the gas velocity, the product may be varied at will, thus producing up to 100% of vinylacetylene, if the converted acetylene products are completely removed from the catalyst effluent.

It is difficult to define the gas velocity in absolute terms for it is subject to the efficiency of contact between the gas stream and the catalyst solution. Obviously for any given catalyst tube and catalyst solution, the rate should be sufficient to form substantially pure vinylacetylene and not greatly in excess of this velocity, because (1) excessively high rates are thermally inefficient and costly, and (2) the difficulties encountered in condensing the product increase rapidly as the rate of gas circulation is increased. The efficiency of contact between gas and catalyst solution are determined by such features as size and shape of the reaction vessel, shape, style and velocity of rotation of the agitator, viscosity of the catalyst solution, etc. In view of these variables, none of which is a feature of this invention, but may be altered at will according to suitable practice or specifications of the prior art, it is advisable to first ascertain the optimum gas circulation for the apparatus to be employed. This rate can be determined for any given apparatus by a simple experiment designed to determine the percentage of vinylacetylene formed as will be disclosed more fully hereinafter. We shall therefore define the circulation rate as that rate which is not greatly in excess of the acetylene circulation necessary to remove vinylacetylene vapor from the reactive catalyst zone as rapidly as formed and before there has been sufficient time for it to undergo appreciable reaction to divinylacetylene or the so-called "tetramer of acetylene", $C_8H_8$.

We have, moreover, found that the production of vinylacetylene is dependent not only upon the rate of circulation but also upon the thoroughness with which it is removed from the gas effluent from the catalyst. In the production of divinylacetylene, it was found that good yields were obtained through the use of condensers held at approximately 0° or even slightly higher. For the production of maximum yields of vinylacetylene it is necessary to strip the acetylene stream of the reaction products under more exacting conditions than this. We have discovered that vinylacetylene may be removed from the acetylene stream in various ways, namely, by low temperature condensation, by condensation through compression, by absorption, or any combination of these three.

The acetylene-vinylacetylene gas mixture leaving the reaction vessel is saturated with water as determined by the partial pressure from the catalyst. It is therefore advantageous to subject the gas to a preliminary condensation process to separate moisture from it before final condensation of the vinylacetylene. This may be accomplished by first passing the mixture through a condenser held at approximately 0° whereby most of the water is removed. Referring to the diagram of patent of Calcott and Downing 1,876,857, such a device as is shown in condenser 9 and separator or flotation chamber 13 is very satisfactory, thus allowing the condensation of water, the continued circulation of the gas and the removal of any oily products which might be formed in the reaction.

This type of separator operates as follows: The condensate from the condenser, of ordinary design, enters a flotation chamber, filling it approximately half full of liquid; the uncondensed gas passes off from the upper portion of this chamber. The condensate consists of the light water insoluble by-products and water, the latter forming a layer in the bottom of the chamber on top of which floats the by-products. An outlet in the bottom of the chamber allows the water to flow back to the catalyst at a rate controlled to maintain a constant water level in the chamber; a drain pipe with outlet located above the water level allows the by-products to drain off of the surface of the water at a similarly controlled rate.

In place of the condenser and flotation separator the gas may be passed through a cold salt solution, circulating through a suitable absorption tower. If the salt solution method is used, its temperature should be held below 0° C. salt being added as necessary to saturate the moisture which is condensed out, or a portion of the solution being continuously removed for concentration. Condensation of the moisture may be facilitated through the application of pressure on the gas stream during the condensation operations. After removal of most of the moisture by one or both of these means, the gas is circulated through condensers designed to remove the vinylacetylene.

If condensation of the vineylacetylene is to be accomplished by low temperatures alone, the condensers must be designed to cool the gas to temperatures below 0° C. The lower the temperature at which the condensers are held, the more complete will be the removal of vinylacetylene from the excess acetylene. It in turn follows, of course, that the more complete the removal of vinylacetylene, the smaller the quantity will be that is returned upon recirculation of the acetylene to the reaction vessel and the lower will be the production of the higher members, such as divinylacetylene. To produce pure vinylacetylene, the use in the condensation step of temperatures equivalent to approximately −60° to −80° C. is desirable though any temperature between 0° and −80° C. may be used with a correspondingly greater production of higher boiling impurities.

To avoid the use of these low temperatures for the condensation of vinylacetylene, pressure may be applied upon the gas to overcome its vapor pressure. Thus we have found, for example, that the application of one atmosphere pressure upon the gaseous products of this system is equivalent to lowering the condenser temperature from −50° C. to approximately −60° to −61° C. In general we prefer to employ pressures not in excess of 11 atmospheres although higher pressures may of course be employed provided suitable apparatus designed to safely handle acetylene at such pressures is provided.

Further to avoid the use of low temperatures, liquid or solid absorbents may be used for the selective absorption of vinylacetylene from the excess acetylene. We have found that the low temperature condenser may be replaced or used in conjunction with a suitable absorption tower equipped to supply a counter flow of an absorbent liquid, or packed with an absorbent solid. For the purpose of this embodiment it is necessary that the absorbent material be capable of dissolving or absorbing a greater quantity of vinyl acetylene than acetylene, and capable of releasing this absorbed vinylacetylene upon suitable treatment. To test the suitability of any material, it may be subjected to treatment with a gaseous mixture containing approximately 5 to 15 volume per cent of vinylacetylene in acetylene; when absorption is complete, as evidenced by the fact that no more of the gaseous mixture is absorbed, the gas is again liberated from the absorbent material either by raising its temperature or by subjecting it to decreased pressure, and the gas so liberated is analyzed. If the liberated gas contains a higher percentage of vinylacetylene than did the gas initially, the absorbent material is suitable for use in the application of this invention, for it has demonstrated its ability to selectively absorb vinylacetylene. Among the solids which we have found useful for this purpose are boneblack, activated charcoal, fuller's earth, kieselguhr, activated silica, activated alumina, etc. Liquids which may be used include furfural, refined paraffin base mineral oil, tetralin, decalin, higher alcohols, glycerol, glycol, and ditolylethane. Broadly, almost all absorbent solids are applicable with varying degrees of efficiency and all liquids which are better solvents for vinylacetylene than for acetylene.

The temperature and pressure for the absorption can be adjusted as desired; the temperature should be increased and/or the pressure decreased during the operation of liberating the hydrocarbons from the absorbent. Obviously, it is desirable to operate two absorbing units alternately in the system, discharging the vinylacetylene from one while the other is actively absorbing or else to circulate the absorbent material, if it be liquid. The discharged vinylacetylene may be collected as a gas or it may be cooled or compressed into a liquid for storage.

In all of the above described systems, the acetylene escaping from the condensers or vinylacetylene absorbers is reenforced with fresh acetylene equivalent to that removed in the formation of products and returned to the catalyst. To maintain this circulation a blower or pump is required at some point in the system. In the event that the condensation steps are carried out under pressure, the circulating pump may also supply this pressure and it is then advantageous to have it located ahead of the condenser; if the entire system is operated at a uniform pressure, whether above, equal to or below atmospheric pressure, the pressure may be regulated by the acetylene supply and a blower can advantageously be located between the condensers and the catalyst tube.

Some provision should be made to preheat the gas stream before entering the catalyst vessel when low temperature condensation is used, for the cold gases have been found to frequently cool the catalyst in the immediate region of their entry to such an extent that the cuprous salts of the catalysts are thrown out of solution in a solid mass on the agitator and walls of the vessel. Various schemes of regenerative heating of the gases have been successfully applied. For example, the hot catalyst gases may be passed into heat exchange with the cold gases leaving the condensers. Other arrangements will be obvious to any one skilled in the art.

In those systems which involve condensation at temperatures below 0° C., ice is formed slowly in the condensers as a light snow. For this reason, it is advisable to have two condenser systems in parallel, so arranged that when one becomes so full of snow that the gas circulation meets with high resistance or the thermal efficiency of the condenser is greatly reduced, it may be cut out for thawing while the second system of condensers carries the load. Owing to the physical form of this deposit of snow, condensers with large gas chambers and finned heat-exchange surfaces have been found especially useful, either internally or externally cooled by means of some efficient refrigerant.

All of the water collected in the various condensation stages should be continuously replaced in the catalyst to maintain a constant catalyst concentration. Likewise, when the catalyst contains a volatile acid, as described in part of the prior art, this should be continuously determined and returned to the catalyst. Thus, in the event that the catalyst contains hydrochloric acid, as is the case with many of the most satisfactory compositions, or any other acid which may form small amounts of reaction products with acetylene, vinylacetylene or any of the products of this polymerization, the extent of this reaction must be determined by analysis and an equivalent amount of the acid replaced in the catalyst. It is frequently convenient to replace the aqueous condensate itself, simply by piping it directly from the separator or condenser to the catalyst tube, or alternatively it may be discarded and replaced by means of an equivalent aqueous solution.

In the event that preliminary cooling is accomplished by passing the gas in contact with a cold salt solution, as described above, fresh water must be added (together with acid if necessary) to replace that condensed as determined by the increase in volume of the salt solution, by its decrease in concentration, or by the quantity of the salt necessary to reestablish the initial concentration.

The vinylacetylene condensed as described above, either by low temperature and/or pressure may contain considerable quantities of dissolved acetylene, depending upon the conditions under which it was separated. If a crude grade of vinylacetylene is satisfactory for the purposes to which it is to be put, it may not be necessary to remove this dissolved acetylene. If a pure grade of material is desired and if it is desired to obtain the maximum yields of vinylacetylene from the acetylene consumed, this acetylene should be fractionated off and returned to the catalyst. To accomplish this it has been found advantageous to pass the condensate from the condenser into a still which also serves as a storage container; this still is held at a temperature slightly below the boiling point of vinylacetylene. The cold vinylacetylene is allowed to warm up in this still and the acetylene evolved during the process is allowed to escape back into the catalyst system through a suitable fractionating column supplied with a low temperature dephlegmator to prevent loss of vinylacetylene and maintain good fractionating conditions.

It has been found that the solid mass of frozen water which collects during the operation of low temperature condensers contains a large quantity of vinylacetylene and acetylene. For this reason, during the process of thawing the frozen condensers, it is advisable to keep one end of the condenser open and connected in series with the operating condenser, so that the vinylacetylene escaping will be recondensed in the system and the acetylene recirculated to the catalyst.

For the purpose of showing more clearly the relation of the various phases of this invention, the accompanying drawing illustrates a suitable arrangement of the apparatus.

It will be understood, however, that the particular arrangement of apparatus described is by no means essential and the individual units may be of any of the well-known types adapted to perform the desired function, such for example as illustrated by Calcott and Downing.

The single figure of the drawing shows a flow-diagram of an arrangement of apparatus adapted for use and employed in Example 1 below.

In the operation of the arrangement of apparatus disclosed in the drawing acetylene is passed from the acetylene supply tank 1 through conduit 2 to the blower 3 and thence through conduit 4 to the preheater 5. A catalyst mixture is placed in tube 7 which is preferably equipped with an agitator and a heating device not shown. Acetylene passing from the preheater through conduit 6 is contacted wtih the catalyst in vessel 7. The emerging gases are led through connection 8 to the preliminary cooler and separator 9, the temperature of which may be controlled by any well-known means. In the drawing, the separator is of the condenser and flotation type described hereinabove. From the separator 9 the entrained water condensed from the emerging gases is returned to the catalyst vessel through conduit 19 while the liquid by-products are discharged through conduit 10.

The unreacted acetylene together with the gaseous products of the reaction pass from the preliminary cooler through conduit 11 to the condensers 12 and 12'. By closing one or the other of valves (18), the gas flow may be directed through either the condenser 12 or 12' as desired, while the alternate condenser is being thawed as described already. It will be observed that the valves are located on the outgoing sides of the condensers, so that the gas escaping from a condenser, while it is thawing, must back up through the inlet pipe and thence pass through the other condenser which is in operation. From the condenser any residual water is automatically returned through conduit 17 to the catalyst in tube 7, while the unreacted acetylene passes through conduit 16 to the circulating blower from whence it is returned to the inlet end of the catalyst tube together with the fresh acetylene entering from the supply tank. The liquid vinylacetylene passes from the condenser 12 into still 13 where any residual acetylene is separated and returned to the blower through conduit 15 while the purified vinylacetylene passes from the still into the storage tank 14.

As previously stated, the position of the blower 10 may be varied and if desired, the circulation may be supplied by a pump capable of delivering pressure.

To further disclose the invention, the following examples are supplied:

Example 1

Seventy kg. of cuprous chloride, 27.1 kg. of ammonium chloride, 7 kg. finely powdered copper, 1.75 liters of concentrated (37%) hydrochloric acid and 30 liters of water are introduced in a horizontal copper tube of approximately twice the volume of the catalyst solution or about 140 liters. This tube, whose length, 183 cm., is approximately six times its diameter, 31.2 cm., is equipped with a horizontal agitator and so designed that it may be held at a constant temperature of from 45° to 100° C. The tube is heated to 50° to 60° and the catalyst solution aged for 24 hours under an atmosphere of nitrogen to insure that all of the copper is reduced to the cuprous state. This catalyst vessel is connected in series to a brine condenser held at 0 to 1° C., an associated separator capable of removing water from the gas stream (said water being returned to the catalyst tube), a condenser held at —60° to —70° by means of suitable refrigeration and a blower which returns the gas effluent from the condenser to the catalyst tube. The condenser is also connected with a still held at 0 to —5° from which vinylacetylene may pass into a storage tank at —15° and from which acetylene may be distilled through a packed column, exhausting back into the acetylene-exit line from the condenser. After the catalyst solution has been aged, the system is swept with acetylene which is introduced through a constant pressure device located at the blower. When the system is essentially free of nitrogen or other gases other than acetylene, agitation is started in the catalyst tube. Rapid absorption of the gas takes place; the blower is next put in operation.

With a gas circulation rate of from 200 to 350 liters per minute considerable quantities of water are condensed in the preliminary cooler (0° to 1° C.) which is continuously returned to the catalyst; a very small quantity of liquid by-products also collects in this cooler, particularly at first; these are continuously removed. Vinylacetylene and ice, saturated with acetylene is collected in the condenser (held at —60° to —70° C.), the vinylacetylene passing into the still where it is held for nearly an hour, while the acetylene is allowed to distill off and return to the system. Vinylacetylene is then tapped off for storage. The effluent from the condenser returning with fresh acetylene to the blower. After several days of operation sufficient ice has collected in the low temperature condenser to necessitate a thaw. This is accomplished by shifting the condensation train to an auxiliary condenser, leaving the frozen condenser connected with the input end of the operating condenser in such a manner that the escaping gas will be subject to the usual condensation before returning to the blower. During the thawing operation, water is returned to the catalyst tube; also throughout the run, chlorine is determined daily on the vinylacetylene produced and the equivalent weight of hydrochloric acid is continuously added to the catalyst. In this manner, 98–100% of the weight of the acetylene consumed appears as vinylacetylene (crude); this crude vinylacetylene containing 80 to 100% vinylacetylene, 1 to 3% halogen derivatives and 0 to 20% of divinylacetylene. This crude vinylacetylene may be used as such or it may be purified by the simple process of fractional distillation.

Example 2

The process of Example 1 is repeated but with the condensers replaced by an absorption tower held at −20° to 0° in which refined paraffin-base mineral oil is brought in contact with the gas stream by counter flow through a packed column or tower, the rate of flow being adjusted so that the oil is nearly saturated with vinylacetylene by the time it reaches the bottom of the tower and the effluent gas contains only a small percentage of vinylacetylene. The oil is then circulated from the absorption tower to a suitable still in which the vinylacetylene is volatilized and the oil rendered applicable for further use.

Example 3

The process of Example 1 is repeated but the blower is replaced by a rotary liquid sealed pump operating in saturated brine solution held at 0° and located ahead of the low temperature condensers in the gas circulation diagram. An orifice disk is placed in the system immediately following the condensers and is so regulated to maintain a pressure of one atmosphere on the condenser. With this pressure, the temperature of the condenser may be 10° higher than in Example 1 and the same yields will be obtained, and the product will be the same. During operation of the pump, the brine must be continuously concentrated to compensate for the moisture condensed therein.

Example 4

The process of Example 1 is repeated using the same equipment except that the preliminary cooler of Example 1 is replaced with a brine spray chamber or brine absorption tower in which the gas stream is brought in direct contact with saturated salt solution at a temperature below 0° C. In this manner, moisture is removed from the gas to the limit of the vapor pressure of water from the saturated brine at the temperature of operation. The effluent gas is circulated directly to the vinylacetylene condenser and the product removed in the manner described in Example 1. An amount of water equivalent to that removed in the separators must be supplied to the catalyst.

It has already been stated that the exact rate of circulation of the acetylene proportionate to the reaction $C_2H_2+C_2H_2=C_4H_4$ and therefore adapted to produce maximum yields will depend upon the conditions of contact between the gas stream and catalyst solution. Under the conditions described in Example 1 a circulation velocity is desirably maintained between 200 to 350 liters per minute.

In other words, the optimum circulation rate for the conditions described in Example 1 may be expressed as the rate capable of changing the total gas volume of the catalyst tube approximately five times a minute. Such a rate is equivalent to a contact time of 10 to 15 seconds.

In order to ascertain the optimum rate for any given apparatus, the process may be operated essentially as described in Example 1 with any convenient circulation rate. When the process has come to equilibrium and the production rate is uniform, note the formation of water insoluble material condensing in the preliminary cooler 9 (see diagram); if the production at this point is over 5% of the total production of crude product at the condenser (12), the circulation is too slow and should be speeded up. Next, remove a sample of the condensate from 12 (the condenser) and distil it through an efficient column; fractions containing acetylene and vinylacetylene will pass over at temperatures below 0° C. and from 0 to 10° C. respectively, leaving a residue from which divinylacetylene may be distilled at approximately 80–85° C. The size of this residue fraction may be taken as an estimate of the divinylacetylene originally in the product. The process may be operated to yield any desired quantity of divinylacetylene, but we prefer to have the quantity of divinylacetylene decreased to less than one-fourth of the vinylacetylene (boiling 0 to 10° C.) obtained. If the quantity of divinylacetylene is more than is desired, it indicates that the circulation rate should be increased. Of course it is understood that a minimum divinylacetylene production will ultimately be reached if the circulation rate is continuously increased, and to decrease this minimum production, it is necesary to more thoroughly strip the vinylacetylene from the gas effluent from the condensers as described above.

It will be apparent from the above that the rate of circulation adapted to give maximum yields may be readily determined for any given apparatus or set of conditions.

In carrying out the present process any catalyst may be used which is capable of promoting the polymerization of acetylene to nonbenzenoid hydrocarbons. Catalysts which have been found to be adapted to this end comprise solutions of a cuprous salt in an aqueous solution of a salt of ammonia or a salt of a tertiary amine which solution has an acidity of not less than that represented by a hydrogen ion concentration of pH 6. It is preferable that the aqueous solution be saturated with respect to the cuprous salt and the salt of ammonia or tertiary amine and to insure saturation an undissolved excess of these salts may be present. However, solutions which are not saturated with these salts are workable but are inferior in activity, the activity decreasing rapidly with a decrease in the concentration of the salt.

Cuprous chloride is superior to other cuprous salts, but all known cuprous salts (e. g. cuprous bromide, iodide and cyanide) will function. The cuprous salt may of course be formed in situ. In order to insure the absence of cupric copper, it is advisable that metallic copper also be present. The presence of metallic copper is not, however, necessary.

Any ammonium or tertiary amine salt may be employed which does not form a completely insoluble cuprous addition compound. No tertiary amine salts have been found which are completely inoperable but they vary greatly in their activity.

Among the salts which have been found suitable may be mentioned the following:

Cuprous salts
(1) Cuprous chloride
(2) Cuprous bromide
(3) Cuprous iodide
(4) Cuprous cyanide Ammonium and amine salts
(1) Ammonium chloride
(2) Ammonium bromide
(3) Ammonium iodide
(4) Ammonium fluoride
(5) Ammonium sulfate
(6) Ammonium acetate
(7) Pyridine hydrochloride
(8) Pyridine formate
(9) Pyridine acetate
(10) Quinaldine hydrochloride
(11) Tributylamine hydrochloride Any combination of the above salts may be employed provided the conditions of acidity are met and a cuprous salt is present.

Any acid which does not render the cuprous salt insoluble may be employed to impart the desired acidity to the solution of cuprous and ammonium salts. Preferably it will be employed in such amounts as to at least impart an acidity represented by a hydrogen ion concentration of pH 6, the activity of the catalyst increasing with the acidity. All or part of the water may be replaced by an organic acid.

If an inorganic acid is added to the solution, it will preferably have an ionization constant of at least $10^{-6}$ and preferably will not be added in such excess as to establish ionizable hydrogen over 0.2% of the weight of the cuprous copper in the system, although concentrations above this limit are not necessarily inoperable.

In short the preferred catalyst is composed of a solution of a cuprous salt and a salt of ammonia or a tertiary amine in either water or an organic acid or mixture of the same, such solution being acid to pH 6 or over. This acidity may be established or maintained by the addition of an inorganic acid which does not render the cuprous salt insoluble in the system, but such inorganic acid addition should preferably not supply ionizable hydrogen in excess of the quantity equivalent to 0.2% of the cuprous copper present. It is thus apparent that the catalyst containing organic acid does not differ from the aqueous inorganic acid catalyst except that a part or all of the water has been replaced by an organic acid.

Catalysts of the type described above may be prepared from cuprous salts and ammonium salts or tertiary amines as disclosed by Nieuwland (Serial No. 153,210) a continuation in part of which has matured into Patent No. 1,811,959 and it may contain also an added acid constituent as described by Nieuwland (Serial No. 505,463) which has matured into Patent No. 1,926,056 or as described by Nieuwland and Vogt in their application hereinabove identified.

The ingredients of the catalyst may be admixed as such or may be formed in situ as is obvious. The temperature of the catalyst should be maintained at 45 to 100° C. and preferably between 50 to 60° C., although these limits are not essential.

The above description of our invention discloses a process for the preparation of vinylacetylene from acetylene in high yields by the use of the catalysts previously described by Nieuwland and Nieuwland and Vogt, and an apparatus and method similar in some respects to that described by Calcott and Downing for the polymerization of acetylene, in which only small yields of vinylacetylene were produced.

Vinylacetylene has the following properties:

(a) Boiling point
5.5° C. at 760 mm. pressure (b)
| Vapor pressure temperature | pressure |
|---|---|
| ° C. | Mm. |
| −50 | 40 |
| −30 | 142 |
| −10 | 400 |
| 0 | 620 |
| +10 | 895 |
| +30 | 1750 |
| +40 | 2350 |
| +60 | 4100 |

(c)
| Density Temp. | $d_4^t$ | Temp. | $d_4^t$ |
|---|---|---|---|
| ° C. | | ° C. | |
| +3 | 0.701 | −30 | 0.744 |
| 0 | 0.708 | −40 | 0.755 |
| −5 | 0.715 | −50 | 0.766 |
| −10 | 0.721 | −60 | 0.778 |
| −20 | 0.732 | −70 | 0.789 |

(d) Solubility
Very slightly soluble in water, but miscible with most organic solvents such as methanol, ethanol, propanol, butanol, ether, acetone, chloroform, carbon tetrachloride, hexane, petroleum ether, acetic acid, propionic acid, butyric acid, benzene, toluene, xylene, solvent naphtha, ethyl acetate, ethyl butyrate, methyl acetate, etc.

As many apparent and widely different embodiments of the invention may be made without departing from the spirit and scope thereof, it is to be understood that we do not limit ourselves to the specific embodiments thereof except as defined in the appended claims.

We claim:

1. The process of producing vinylacetylene which comprises polymerizing acetylene in the presence of a polymerization catalyst comprising essentially a liquid having an acid reaction of at least pH 6 and containing in solution a cuprous salt and an ammonium compound of the class consisting of ammonium salts and salts of the tertiary amines, and removing the resulting vinylacetylene before substantial amounts of divinylacetylene are formed.

2. The process of claim 1 wherein the catalyst mixture is held at a temperature between 45° and 100° C.

3. The process of claim 1 wherein the acetylene is contacted with and removed from the catalyst mixture at a rate corresponding to the rate of the reaction:

$$C_2H_2 + C_2H_2 = C_4H_4$$

4. The process of claim 1 wherein the catalyst comprises a saturated aqueous solution of ammonium chloride and of cuprous chloride.

5. The process of claim 1 wherein the catalyst comprises a saturated aqueous solution of ammonium chloride and of cuprous chloride and an amount of an inorganic acid having an ionization constant of at least $10^{-6}$ to establish a hydrogen ion concentration of at least pH 6 but not in such excess as to establish ionizable hydrogen equivalent to over 0.2% of the cuprous copper.

6. The process of claim 1 wherein the catalyst comprises a saturated aqueous solution of ammonium chloride and of cuprous chloride and an amount of hydrochloric acid sufficient to establish a hydrogen ion concentration of at least pH 6 but not in such excess as to establish ionizable hydrogen equivalent to over 0.2% of the cuprous copper.

7. The process of claim 1 wherein the catalyst is prepared from substantially 27.1 parts of ammonium chloride, substantially 1.75 parts of 37% hydrochloric acid, substantially 70 parts of cuprous chloride and 30 parts of water.

8. In the process for the continuous production of vinylacetylene which involves continuously passing acetylene into contact with a polymerization catalyst comprising essentially a solution of a cuprous salt and an ammonium compound of the class consisting of ammonium salts and the salts of tertiary amines (said solution having an acid reaction of at least pH 6, but not containing ionizable hydrogen derived from an inorganic acid in excess of that quantity equivalent to 0.2% of the cuprous copper), the steps of continuously removing the resulting vinylacetylene together with unreacted acetylene from the catalyst zone before substantial amounts of divinylacetylene are formed, separating the unreacted acetylene from the vinylacetylene and returning the unreacted acetylene to the catalyst.

9. The process of claim 8 wherein the mixture of unreacted acetylene and vinylacetylene discharged from the catalyst is cooled to a temperature not in excess of 0° C. to effect condensation of the vinylacetylene prior to the return of the unreacted acetylene to the catalyst.

10. The process of claim 8 wherein the mixture of unreacted acetylene and vinylacetylene discharged from the catalyst is cooled to a temperature not in excess of 0° C. under pressures above atmospheric to effect condensation of the vinylacetylene prior to the return of the unreacted acetylene to the catalyst.

11. The process of claim 8 wherein the mixture of unreacted acetylene and vinylacetylene discharged from the catalyst is cooled to a temperature not in excess of 0° C. under a pressure of not over 11 atmospheres to effect condensation of the vinylacetylene prior to the return of the unreacted acetylene to the catalyst.

12. The process of claim 8 wherein the mixture of unreacted acetylene and vinylacetylene discharged from the catalyst is cooled to a temperature between −50 and −60° C. under a pressure of substantially one atmosphere to effect condensation of the vinylacetylene prior to the return of the unreacted acetylene to the catalyst.

13. The process of claim 8 wherein the mixture of unreacted acetylene and vinylacetylene discharged from the catalyst is cooled to a temperature between −60° to −80° C. to effect condensation of the vinylacetylene prior to the return of the unreacted acetylene to the catalyst.

14. The process of claim 8 wherein the separation of the vinylacetylene from the unreacted acetylene is accomplished by passing the gaseous mixture through a selective absorbent material.

15. The process of claim 8 wherein the separation of the vinylacetylene from the unreacted acetylene is accomplished by passing the gaseous mixture in counter flow through a refined paraffin-base mineral oil at a temperature not in excess of 0° C.

16. The process of claim 8 wherein the mixture of vinylacetylene and acetylene discharged from the catalyst is passed through a cooler to remove the entrained moisture prior to the separation of the vinylacetylene and acetylene.

17. The process of claim 8 wherein the acetylene is contacted with the catalyst mixture for at least 10 and not more than 15 seconds.

18. The process of claim 8 wherein the mixture of vinylacetylene and acetylene discharged from the catalyst is passed into contact with brine at a temperature adapted to condense the entrained moisture.

19. In a process for the production of non-benzenoid polymers of acetylene comprising vinylacetylene which involves polymerizing acetylene at a temperature not higher than 100° C. in the presence of a catalyst capable of promoting the polymerization of acetylene to non-benzenoid polymers of acetylene, the steps of passing the acetylene continuously into contact with the catalyst, removing the resulting vinylacetylene together with unreacted acetylene from the catalyst zone before substantial amounts of divinylacetylene are formed, separating the unreacted acetylene from the vinylacetylene and returning the unreacted acetylene to the catalyst.

20. In a process for the production of non-benzenoid polymers of acetylene comprising vinylacetylene which involves polymerizing acetylene at a temperature not higher than 100° C. in the presence of a catalyst capable of promoting the polymerization of acetylene to non-benzenoid polymers of acetylene, the improvement which comprises passing a stream of acetylene into contact with the catalyst and removing the resulting vinylacetylene together with the unreacted acetylene from the catalyst zone before substantial amounts of divinylacetylene are formed.

21. In the process for the continuous production of vinylacetylene which involves continuously passing acetylene into contact with an aqueous cuprous chloride catalyst capable of promoting the polymerization of acetylene to non-benzenoid polymers of acetylene, the steps of continuously removing the resulting vinylacetylene together with unreacted acetylene from the catalyst zone before substantial amounts of divinylacetylene are formed, separating the unreacted acetylene from the vinylacetylene and returning the unreacted acetylene to the catalyst.

22. In a process for the production of non-benzenoid polymers of acetylene comprising vinylacetylene which involves polymerizing acetylene at a temperature not higher than 100° C. in the presence of a catalyst capable of promoting the polymerization of acetylene to non-benzenoid polymers of acetylene and comprising an aqueous solution of cuprous chloride and an ammonium compound of the class consisting of ammonium salts and salts of tertiary amines, the improvement which comprises passing a stream of acetylene into contact with the catalyst and removing the resulting vinylacetylene together with the unreacted acetylene from the catalyst zone before substantial amounts of divinylacetylene are formed.

23. In a process for the production of non-benzenoid polymers of acetylene comprising vinylacetylene which involves polymerizing acetylene at a temperature not higher than 100° C. in the presence of a catalyst capable of promoting the polymerization of acetylene to non-benzenoid polymers of acetylene and comprising an aqueous solution of cuprous chloride containing no suspended material, the improvement which comprises passing a stream of acetylene into contact with the catalyst and removing the resulting vinylacetylene together with the unreacted acetylene from the catalyst zone before substantial amounts of divinylacetylene are formed.

24. In a process for the production of monovinylacetylene, the steps which comprise passing acetylene into contact with a catalyst capable of promoting the polymerization of acetylene to non-benzenoid polymers of acetylene, then separating the reaction product and unreacted acetylene from the catalyst before substantial amounts of divinylacetylene are formed and recharging the catalyst with acetylene.

25. In a process for the production of monovinylacetylene, the steps which comprise passing acetylene into contact with an aqueous acid cuprous chloride catalyst capable of promoting the polymerization of acetylene to non-benzenoid polymers of acetylene, then separating the reaction products and unreacted acetylene from the catalyst before substantial amounts of divinylacetylene are formed and recharging the catalyst with acetylene.

26. In a process for the production of monovinylacetylene, the steps which comprise passing acetylene into contact with a catalyst comprising an aqueous solution of cuprous chloride and ammonium chloride and having an acid reaction of at least ph 6, then separating the reaction products and unreacted acetylene from the catalyst before substantial amounts of divinylacetylene are formed and recharging the catalyst with acetylene.

ALBERT S. CARTER.
FREDERICK B. DOWNING.